Feb. 26, 1957  J. L. DUNN  2,783,466
RADAR RECEIVER AUTOMATIC NOISE LEVELING CIRCUITS
Filed Sept. 15, 1949  2 Sheets-Sheet 1
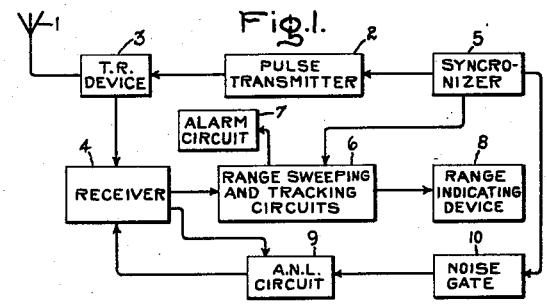
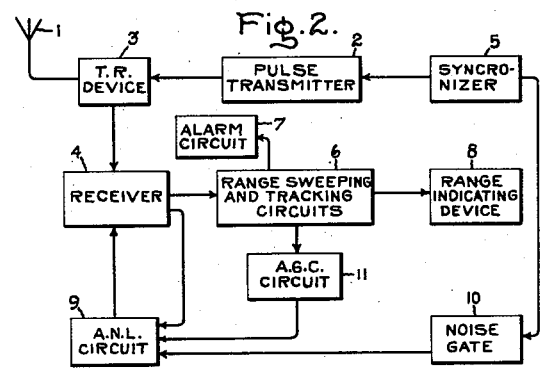
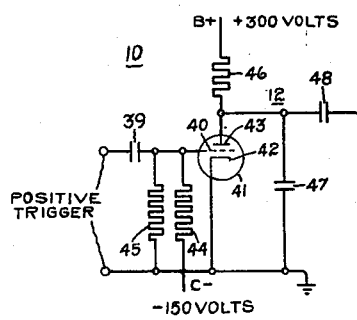
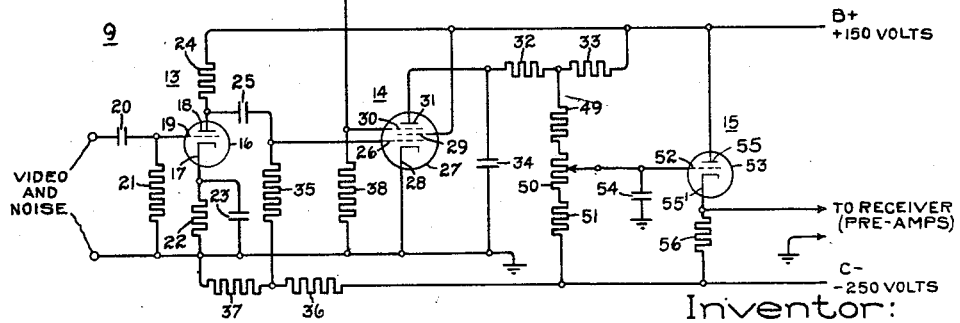
Inventor:
Jenus L. Dunn,
by Merton D Morse
His Attorney.

Feb. 26, 1957 J. L. DUNN 2,783,466
RADAR RECEIVER AUTOMATIC NOISE LEVELING CIRCUITS
Filed Sept. 15, 1949 2 Sheets-Sheet 2
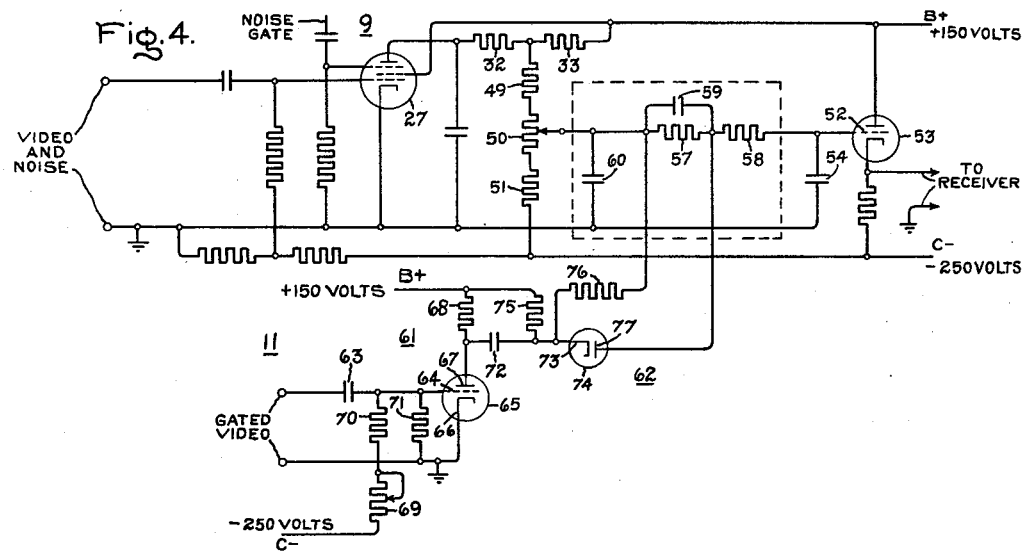
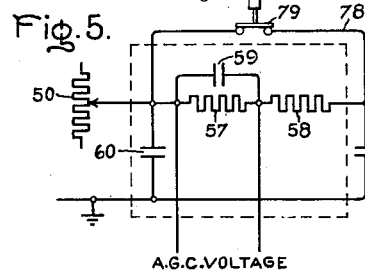
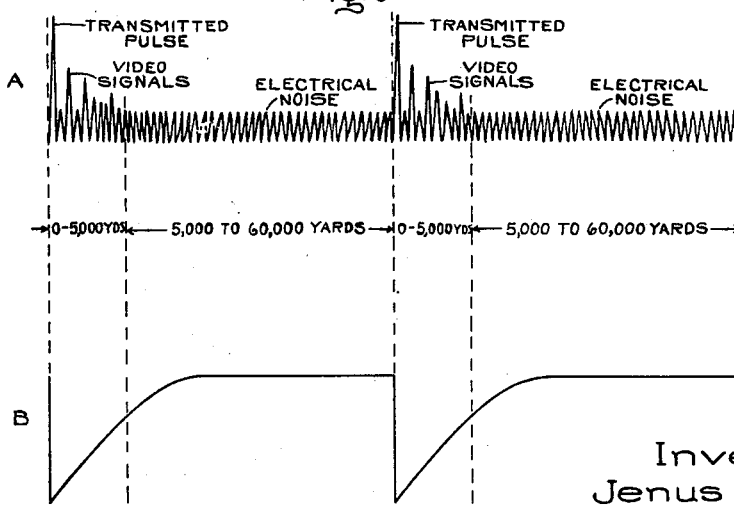
Inventor:
Jenus L. Dunn,
by Merton D Morse
His Attorney United States Patent Office 2,783,466
Patented Feb. 26, 1957

2,783,466

RADAR RECEIVER AUTOMATIC NOISE LEVELING CIRCUITS

Jenus L. Dunn, Hutchinson, Kans., assignor to General Electric Company, a corporation of New York Application September 15, 1949, Serial No. 115,889

7 Claims. (Cl. 343—17.1)

My invention relates to systems for receiving electromagnetic pulses and more particularly to distance determining or object locating systems of the pulse echo type.

It is well known that the distance to an object can be determined by transmitting periodically recurring pulses toward the object and measuring the time interval between the transmission of each pulse and the reception of an echo signal reflected from the object. In many such object locating systems, commonly called radar systems, automatic target searching networks are often employed to scan through a spatial sector either in range or declination in an attempt to detect echo signals reflected from objects within the sector. Furthermore, in order to warn an operator of the presence of an object within the sector, alarm circuits which are actuated by a received echo signal are often included. In order to obtain maximum sensitivity, such alarm systems are usually adjusted to be energized at a threshold voltage which is just slightly above the noise level produced by thermal agitation within receiving electron discharge devices and by other random impedance variations in the receiving system. It is evident that if this noise voltage level decreases, the alarm circuit becomes less sensitive and will not be actuated by faint echo signals; and conversely, that if this noise voltage level increases, the alarm circuit will be energized by the noise peaks rather than by the echo signals. Accordingly, a principal object of my invention is to provide electrical means for automatically maintaining the electrical noise produced in a pulse receiving system at a constant predetermined voltage level.

Many such radar systems also include automatic receiver gain controlling networks which function to decrease the gain of the receiving system upon the reception of strong echo signals in order to maintain a fairly constant signal strength delivered to a signal indicating device. It is apparent that such gain controlling networks also cause a large variation in the noise level of the receiving system and tend to operate in contradiction to any automatic noise leveling network. Accordingly, it is another more specific object of my invention to provide an automatic noise leveling circuit in a pulse receiving system which may be employed in conjunction with an automatic receiver gain controlling network.

Broadly stated, my invention includes means to obtain a sample of amplified receiver noise voltage at recurring periods of time when no echo signals are superimposed thereon. A direct current component of this pure noise signal is then detected and fed back to the receiver to control the gain of the receiver and thereby to maintain the noise level by degenerative compensatory action. If, for example, the noise level tends to increase, the gain of the receiver, and consequently, the noise output is automatically decreased and a substantially constant noise level results.

When employed in conjunction with a receiver system employing automatic receiver gain control, this detected pure noise signal is combined with the automatic gain control output fed back to the receiver; and the amount of compensatory action introduced by the automatic noise leveling system is limited to have no appreciable effect upon the operation of the automatic gain controlling network.

The novel features which I believe to be characteristic of my invention are set forth with particularity in the appended claims. My invention itself, however, together with further objects and advantages thereof can best be understood by reference to the following description taken in connection with the accompanying drawings in which:

Fig. 1 is a simplified block diagram of an automatic radar range indicating and tracking system in which my invention is suitably embodied;

Fig. 2 is a simplified block diagram of an automatic radar range tracking system similar to Fig. 1 but embodying my invention in conjunction with an automatic receiver gain controlling network;

Fig. 3 is a schematic diagram of an automatic noise leveling circuit which may be employed in the radar system of Fig. 1;

Fig. 4 is a schematic diagram of a modification of the noise leveling network of Fig. 3 in conjunction with an automatic gain controlling network, such as may be employed in the radar system of Fig. 2;

Fig. 5 is a modification of the coupling network between the automatic noise leveling circuit and the automatic gain control circuit of Fig. 4; and Fig. 6 includes a pair of typical wave forms explanatory of the operation of the noise detector stage in the automatic noise leveling circuit. In the drawings, similar reference numbers indicate like elements.

The automatic range indicating and tracking radar system of Fig. 1 includes an antenna 1 which transmits periodically recurring pulse signals delivered to the antenna 1 from a pulse transmitter 2 through a transmit-receive device 3. Since the same antenna 1 is employed to receive the echo signals as well as to transmit the incident pulses, the transmit-receive device 3, which may be any suitable known type, functions to protect delicate radar receiving equipment, such as a pulse receiver 4, from the intense transmitted pulses while permitting the faint echo signals to be delivered to the receiver 4 without attenuation.

A synchronizing or trigger generating circuit 5 serves to synchronize the time base of range tracking circuits 6 to the transmitted pulses. As is known to the art, these range tracking circuits 6 generate a series of gating pulses which are delayed in time, and consequently in range, with respect to the transmitted pulses so as to enable these gating pulses to bracket any desired echo signal delivered to the range tracking circuits 6 from receiver 4 and selected for range tracking. Automatic range gate sweeping networks are also commonly included in the range tracking circuits 6. Various suitable types of automatic range tracking circuits are known to the art. They may, for example, be constructed as shown in the copending application, Serial No. 400,080, filed June 27, 1941, by William C. Hahn for "Impulse Systems," or as shown in Patent 2,467,208, issued April 12, 1949, to William C. Hahn for "Pulse-Echo System," both of which are assigned to the same assignee as the present invention. Very briefly, these range gate sweeping networks function to adjust continuously the time delay of these gating pulses in order to cause them to sweep periodically throughout the entire range of the radar system in search of echo signals. When an echo signal of sufficient signal strength is received, an alarm circuit or relay 7 is energized automatically and functions to warn the operator of the detection of an echo signal as well as to disable the range gate sweeping network and permit range tracking. In order to obtain maximum sensitivity, this alarm circuit 7 is adjusted to be energized by any echo signal whose magnitude is just slightly above the level of electrical noise generated in the receiving system. The output of the range tracking circuits 6 is then supplied to a proper range indicating device 8 such as a calibrated voltmeter, to give immediate and continuous indication of the range of an object, such as an airplane, causing an echo signal.

The output of the pulse receiver 4 comprising both electrical noise and detected video signals is applied to an automatic noise leveling or A. N. L. circuit 9. This automatic noise leveling circuit 9 is gated by a noise gating network 10 which is synchronized to the transmitted pulses and which disables the automatic noise levelling circuit during the time interval that echoes are being received. The automatic noise leveling circuit 9 is therefore operative only during that portion of the time base intermediate each transmitted pulse which represents a range beyond which echo signals will commonly be received. If, for example, the maximum range of the radar system is 5000 yds. and the time interval between successive transmitted pulses represents a total range of 60,000 yds., the noise gating network 10 is adjusted to enable the automatic noise leveling circuit 9 to be operative somewhere within the 5000 yd. to 60,000 yd. time interval and preferably during an interval far beyond the 5000 yd. range in order to preclude the possibility of echo signal from land targets which lie beyond the 5000 yd. range. It will be appreciated, therefore, that only pure electrical noise without echo signals will usually be delivered to the automatic noise leveling circuit from the receiver during this operative period. This pure noise sample is converted by the automatic noise leveling circuit into a representative unidirectional voltage which is coupled back to the receiver in a manner adapted to degenerate the gain of the receiver. Since the electrical noise produced by the receiver 4 is a direct function of the amplification thereof, a compensatory action is thus introduced which maintains the noise level near any predetermined setting as will be more fully explained hereinafter.

Referring to Fig. 2, I have illustrated in block diagram form a modification of the radar system of Fig. 1 wherein an automatic gain control or A. G. C. circuit 11 is included. This automatic gain control circuit is actuated only by echo signals which are bracketed by the gating pulses generated in the range tracking circuits 6 and which are supplied to the automatic gain control circuit 11 as indicated. If the strength of these bracketed video signals exceeds a predetermined magnitude, this automatic gain control circuit functions in a known manner to reduce the gain of the receiver automatically so as to maintain an optimum signal strength. Since both the automatic gain control circuit 11 and the automatic noise leveling circuit 9 function to alter the gain of the receiver 4, I have combined both networks as indicated in Fig. 2 by utilizing a common output circuit preferably located in the automatic noise leveling circuit 9. The voltage derived by this automatic noise leveling circuit is then fed back to the receiver 4 in order to degenerate the gain of the receiver 4 in accordance with both the noise and the video signal strength.

A schematic diagram of a noise gating circuit 10 and an automatic noise leveling circuit 9 such as may be employed in the radar system of Fig. 1 is shown in Fig. 3. The noise gating circuit 10 is shown as comprising a trigger stretching stage 12; and the automatic noise leveling circuit 9 is shown as comprising a noise amplifier stage 13, a gated noise detector stage 14 and a cathode follower output stage 15.

The noise amplifier stage 13 includes an electron discharge device or tube 16 having a cathode 17, an anode 18 and a control electrode or grid 19. The control electrode 19 is directly connected to an input coupling capacitance 20 which is connected to receive the combined video and noise signal output of the receiver 4. A direct current return resistance 21 is, of course, connected from the control electrode 19 to ground. A proper biasing voltage for the tube 18 is maintained by a cathode resistance 22 and a by-pass capacitance 23 connected in parallel from the cathode 17 to ground. The anode 18 is connected through a load resistance 24 to a source of positive potential, conventionally designated as B+; and the output of the stage is taken through a coupling capacitance 25 connected between the anode 18 and a control electrode or first grid 26 of an electron discharge device or tube 27 in the noise detecting stage 14.

The electron discharge device 27 also includes a cathode 28, a screening electrode or grid 29, a secondary emission suppressing electrode or suppressor grid 30 and an anode 31. The cathode 28 is connected directly to ground and the screen grid 29, is connected directly to B+. The anode 31 is also connected to B+ through a series voltage dividing network comprising load resistances 32 and 33. An alternating current filter capacitor 34 is also connected from the anode 31 across the tube 27 to ground. This noise detecting tube 27 is biased slightly below the discharge cut-off point by a connection from the control grid 26 through a direct current return resistance 35 to a voltage dividing network comprising a pair of resistances 36 and 37 connected in series from a source of negative potential C— to ground.

In order to disable the noise detector stage 14 during the time interval that video signals are received, the output of the noise gating circuit 10 is supplied to the suppressor grid 30 which is connected through a grid return resistance 38 to ground. This noise gating circuit 10, comprising the trigger stretching stage 12, receives a positive trigger from the synchronizing circuit 5 through a coupling capacitance 39 connected to a control electrode or grid 40 of an electron discharge device or tube 41. The tube 41 also includes a cathode 42 and an anode 43. The control grid 40 is biased below the discharge cut-off point of tube 41 by connection to a voltage dividing network comprising a pair of resistances 44 and 45 connected in series between C— and ground. The cathode 42 is connected directly to ground and the anode 43 is connected through a load resistance 46 to a source of high positive potential B+. A capacitor 47 is connected across the tube 41 from the anode 43 to ground, and together with the load resistance 46 accomplishes the trigger stretching function of the circuit. In order to provide a proper gate width, the values of resistance 46 and capacitance 47 are chosen to have a time constant greater than the time interval equal to the maximum range of the radar system. The output voltage of this noise detecting circuit developed at the anode 43 is delivered to the suppressor grid 30 of the noise detecting tube 27 through a coupling capacitance 48.

The output voltage of the noise detector stage 14 is developed across three resistive elements comprising resistance 49, potentiometer 50 and resistance 51 connected in series from C— to the point of connection between load resistances 32 and 33. The arm of the potentiometer 50 is connected to a control electrode or grid 52 of an electron discharge device or tube 53 in the cathode follower output stage 15, and to one side of a filtering capacitance 54 whose other side is grounded. The cathode follower tube 53 has an anode 55 which is connected directly to B+ and a cathode 55' connected through a load resistance 56 to C—. The output of the entire automatic noise leveling circuit is taken between the cathode 55' and ground and is preferably applied as biasing voltage to one or two stages of intermediate frequency amplification in the receiver 4.

Referring now to Fig. 4, I have shown a schematic diagram of the automatic gain control circuit 11 and the automatic noise leveling circuit 9 incorporated in the radar system of Fig. 2. The automatic noise leveling circuit is identical to the circuit shown in Fig. 3 with the exception of an automatic gain control coupling network enclosed within dashed lines and comprising a pair of resistances 57 and 58 connected in series from the control electrode 52 of the cathode follower tube 53 to the arm of potentiometer 50, capacitance 59 connected across resistance 57, and an additional filter capacitance 60 connected from the arm of potentiometer 50 to ground.

The automatic gain control circuit itself is similar to that described and claimed in application, Serial No. 22,412, filed April 21, 1948, by Robert L. Sink for "Automatic Gain Control Circuits For Pulse Receivers," and assigned to the same assignee as the present invention. This automatic gain control circuit 11 includes a video amplifier stage 61 and a video detector stage 62. A gated video signal is supplied to the video amplifier 61 from the range tracking circuits 6, as previously explained, through a coupling capacitance 63 connected to a control electrode or grid 64 of an electron discharge device or tube 65. A cathode 66 of the tube 65 is directly connected to ground while an anode 67 is connected through a load resistance 68 to B+. The tube 65 is biased an adjustable amount below the discharge cut-off point by connection from the control grid 64 to a voltage dividing network comprising rheostat 69, resistance 70 and resistance 71 connected in series from C— to ground.

The output of the video amplifier stage 61 developed across load resistance 68 is supplied to the video detector stage by a coupling capacitance 72 connected between the anode 67 and a cathode 73 of a diode detector 74. The cathode 73 is also connected to B+ through a voltage dropping resistor 75 and to the arm of potentiometer 50 through a resistance 76. An anode 77 of diode 74 is connected to the point of connection between resistances 57 and 58. It will be appreciated that resistance 75, resistance 76, a portion of potentiometer 50 and resistance 51 comprise a voltage dividing circuit connected from B+ to C— which functions to maintain the cathode of 73 of diode 74 at a positive potential with respect to the anode 77 in order to maintain the diode 74 in a non-conducting state in the absence of an output voltage from the video amplifier stage 61.

In Fig. 5, I have shown a modification of the coupling network between the automatic gain control circuit 11 and the automatic noise leveling circuit 9 enclosed within the dashed lines of Fig. 4 whereby the automatic gain control circuit 11 may be completely disabled from the automatic noise leveling circuit 9 until a video signal is received and bracketed by a gating pulse of the range tracking circuits. The coupling network comprising resistance 57, resistance 58 and capacitor 59 is shortcircuited by a conductor 78 connected from the arm of potentiometer 50 through a normally closed switch 79 to the control electrode 52 of the cathode follower tube 53. The switch 79 is constructed to be opened by a relay 80 of the alarm circuit 7 which is energized in a known manner whenever a video signal of sufficient strength is bracketed by the gating pulse of the range tracking circuit 6.

The fundamental operation of my invention can be easily understood by reference to the schematic diagram of Fig. 3. Negative-going video pulse signals superimposed on electrical noise are delivered from the output of the receiver 4 and coupled to the grid of the discharge device 16 through capacitor 20. The device 16 is biased by cathode resistance 22 and by-pass capacitance to function as a conventional class A amplifier thereby producing amplified positive-going video pulses and amplified electrical noise at the anode 18. This amplified video and noise voltage developed across load resistance 24 is applied through the coupling capacitance 25 to the control electrode 26 of the pentode tube 27 in the noise detector stage 14. A typical input voltage wave applied to grid 26 is shown in Fig. 6a as a function of time. As previously explained, the video signals which are applied to the grid 26 of the noise detector tube 27 can only exist during the initial period of the time interval between successive transmitted pulses representing the maximum range of echo detection by the radar system. During the remainder of the time interval between pulses, only the electrical noise due to the receiver itself is present. The noise detector stage 14, however, is permitted to operate only during a portion of this pure noise period of the time interval between pulses. Many different means of maintaining the detector stage 14 inoperative during the video signal receiving period will, of course, occur to those skilled in the art. The detector tube 27, for example, may be biased at a point far below cut-off, and an enabling positive gating pulse may be applied to a grid of the tube 27 during the pure noise period only. However, because of the resultant ease of time base synchronization, I prefer to bias the electric discharge device at a point slightly below cut-off and to apply a negative disabling gating pulse to the detector tube 27 during the initial video receiving periods only.

The noise gating circuit 12 provides this negative gating pulse. The gating tube 41 is biased a predetermined amount below cut-off by the voltage dividing network comprising resistor 44 and 45 connected to the control grid 46. A positive trigger is supplied from the synchronizing unit 5 at the same time the transmitter 2 is pulsed and is applied through coupling capacitance 39 to the grid 40. This positive trigger must be of sufficient amplitude to raise the grid voltage above the discharge cut-off point of the gating tube 41. During the period of time that the tube 41 is in a non-conducting condition, the capacitance 47 is charged through load resistance 46 to the potential of the high voltage source B+. When the positive trigger causes the tube 41 to conduct, the capacitance 47 immediately discharges through the tube and, after the trigger pulse has passed, begins to charge again through the load resistance 46. The time constant of capacitance 46 and resistance 47 is such that the charging time is greater than the time interval representing the maximum range of the radar system as can be easily seen by reference to Fig. 6b in which I have shown a typical voltage wave produced across capacitance 47 along the same time base as Fig. 6a. This negative gating voltage developed across capacitance 47 is coupled through capacitor 48 to the suppressor grid 30 of the detector tube 47 and functions in a known manner to disable the detector stage 14 during the duration of this negative gate. It is to be understood that although I preferably employ a trigger stretching network 12 to obtain this negative disabling gating pulse, many other gating circuits such as triggered multivibrators may alternatively be provided.

After the negative disabling pulse has passed, noise detector tube 27 conducts according to the amplitude of the noise signal present on the control grid 36. Since the grid 26 is biased slightly below cut-off by connection to the voltage dividing network comprising resistances 36 and 37, the voltage developed across load resistances 32 and 33 will have a negative direct current component which is filtered from the alternating current component by the fairly large capacitance 34. The magnitude of resistances 32 and 33 and the capacitance 34 in this filtering network are preferably chosen to have a long time constant in order to provide a unidirectional output voltage that is responsive to the peak noise level output of the receiver 4. A fraction of this representative unidirectional voltage output, depending upon the amount of noise levelling compensation desired and determined by the relative magnitudes of load resistances 32 and 33 and of the voltage dividing network comprising resistance 49, potentiometer 50 and resistance 51, is applied through the arm of potentiometer 50 to the grid 52 of the cathode follower output tube 53 where it is filtered still further by the alternating current by-pass capacitance 54. This unidirectional voltage functions to bias the cathode follower tube 53 and thereby to produce a unidirectional output voltage which varies inversely in accordance with the magnitude of the noise voltage output of the receiver 4. Since the cathode follower tube 53 is connected as part of the voltage dividing network between a high negative potential C— and a positive potential B+, the output voltage is negative with respect to ground and controls the gain of the receiver 4 by functioning for example as the biasing voltage for one or two stages of intermediate frequency amplification in the receiver.

In order to set the operating level of the automatic noise leveling circuit, the gain of the receiver 4 is simply increased by a separate manual volume control of the receiver 4 (not shown in the drawings) until a proper signal-to-noise ratio for maximum sensitivity is obtained. This noise voltage is applied to the control grid of the detector tube 27 through the noise amplifier stage 13 and produces a direct current component due to the flow of anode current in the output circuit of the detector which, because of a proper biasing voltage applied to the tube, is approximately midway between the direct current component produced at cut-off and the component produced with anode current saturation of the tube 27. If the noise level output of the receiver 4 thereafter increases, the unidirectional voltage produced at the point of connection between load resistances 32 and 33 becomes more negative, and the biasing voltage applied to the receiver is proportionally increased in order to decrease the gain of the receiver and consequently to decrease the noise. The amount of compensatory action plus introduced is obviously a function of the amplification of the noise ouput of the receiver, the ratio of the load resistance 32 to the load resistance 33, and of the setting of potentiometer 50.

In the operation of the modification of my invention employed in conjunction with an automatic gain control circuit as illustrated in Fig. 4, a gated video signal, as previously defined, is applied through capacitance 63 to the grid 64 of the amplifier tube 65, which is normally biased beyond cut-off by means of the voltage divider comprising resistances 69, 70 and 71. When the gated video signal exceeds the cut-off potential of amplifier tube 65, anode current flows and an amplified negative-going voltage drop appears across resistance 68. This negative-going signal is applied to the cathode 73 of diode 74 causing the diode 74, which is normally biased beyond cut-off, as previously explained, to conduct. Thus a rectified negative-going voltage appears across diode load resistance 57 which varies in accordance with the input video signal. This rectified voltage is filtered by the relatively long time constant filter comprising resistance 58 and capacitance 54 and applied to the grid 52 of the output cathode follower tube 53. As the applied video signal increases, this rectified automatic gain control voltage becomes more negative and decreases the gain of the receiver 4 through the output of the cathode follower tube 53 in order to limit the video signal to a substantially constant signal strength.

It will be appreciated that this automatic gain control voltage operates in contradiction to the automatic noise leveling voltage. When the receiver gain is decreased due to a strong video signal applied to the automatic gain control circuit, the automatic noise leveling circuit tends to increase the gain of the receiver because of the consequent decrease in the noise level. I have resolved this contradiction by adjusting the automatic noise leveling circuit to provide only a limited compensatory action. Since the variation in the noise level due to the internal impedance variations of the receiver circuit parameters is quite small, the range of variation of receiver gain due to the automatic noise leveling circuit need only be correspondingly small in order to maintain a constant noise level while the radar system is searching for an echo signal. A range of variation in the output of the automatic noise leveling circuit in the neighborhood of ±5 volts has been found to be quite ample to maintain a constant noise level when no automatic gain control voltage is developed. In order to provide good sensitivity and immediate compensatory action within such a limited range of variation of the automatic noise leveling output voltage, the ratio of load resistance 32 to load resistance 33 is constructed to be quite high, in the neighborhood for example of 10 to 1, and the amplification of the noise level in the automatic noise leveling circuits is also kept high.

When an echo signal is detected and gated, the automatic noise leveling circuit continues to maintain the noise level until the gated video signal reaches sufficient strength to cause the automatic gain control detector 74 to conduct. As the diode detector conduction increases, the gain of the receiver and consequently the noise level is quickly reduced sufficiently to cut-off the noise detector tube 27 and to disable the noise detector stage 14 at its upper limit of voltage output, so that only the automatic gain control circuit 11 effects the receiver gain upon any further increase of video signal.

It will thus be appreciated that I have fulfilled the objects of my invention as previously set forth. I have provided a completely automatic electric means for maintaining a constant noise level in a pulse receiving system which may easily be adapted to be employed in a radar system having an automatic gain control circuit without interfering with the operation of this automatic gain control circuit when a strong pulse echo signal is received. It is to be understood that although I have shown and described certain particular embodiments of my invention, many other modifications will obviously occur to those skilled in the art and I, therefore, intend by the appended claims to cover all such modifications as fall within the true spirit and scope of my invention.

What I claim as new and desire to secure by Letters Patent of the United States is:

1. In a radar system, a pulse receiver having a recurrent period of output voltage comprising an interval of pulse signals superimposed on electrical noise followed by an interval of pure electrical noise, a noise detector capable of being selectively disabled coupled to said receiver for supplying a first unidirectional voltage varying inversely in accordance with the amplitude of an applied noise voltage, means coupled to said noise detector to produce a gating voltage for disabling said noise detector during a portion of said interval of pulse signals including substantially all of said signal pulses, a pulse detector responsive to said pulse signals which exceed a predetermined magnitude only, said pulse detector supplying a second unidirectional voltage varying inversely in accordance with the amplitude of said selected pulse signals, and receiver gain controlling means responsive to both of said unidirectional voltages for varying the gain of said receiver degeneratively with respect to the amplitude both of said electrical noise and of said pulse signals, thereby to maintain said noise level at a substantially constant value when no pulse signals are selected and to limit said selected pulse signals to said predetermined magnitude.

2. An automatic gain control circuit for a receiver of recurrent pulse signals the interval between recurrent signals including a period of pulse reception and a period of non-pulse reception and having an output waveform including corresponding recurrent pulse signals superimposed on continuous noise signals comprising a peak detector, connected to said receiver for deriving a first unidirectional control potential in response to applied signals, means for disabling said detector during a portion of said period of pulse reception including substantially all of said signal pulses, means for controlling the gain of said receiver over a given range in accordance with said control potential, a second peak detector, connected to said receiver for deriving a second, unidirectional control potential in response to applied signals, means for disabling said second detector during said period of non-pulse reception, and means for controlling the gain of said receiver in accordance with said second control potential over a substantially larger range.

3. In pulse echo apparatus including means for transmitting wave pulses having a given repetition period and means for intercepting corresponding pulses from remote objects occurring within operating intervals following transmitted pulses and having a duration equal to a fraction of said period, an automatic-noise leveling system comprising a signal translating channel having an output circuit and an amplification-control circuit, supplied with said corresponding pulses from said intercepting means and subject to random noise signals, a noise detector coupled to said output circuit of said channels and including means for deriving a control potential in response to applied noise signals, a gating-signal generator synchronized with said transmitting means and coupled to said noise detector for producing a gating pulse in each repetition period of said pulse-type wave having a duration corresponding substantially to said duration of said operating intervals to disable said detector during said operating intervals, and means for coupling said potential-deriving means of said noise detector to said amplification-control circuit of said signal translating channel to apply said control potential thereto for adjusting the amplification of said channel inversely with the amplitude of noise signals applied to said detector.

4. In pulse echo apparatus including means for transmitting wave pulses having a given repetition period and means for intercepting corresponding pulses from remote objects within operating intervals following transmitted pulses and having a duration equal to a fraction of said period, a receiving system comprising a signal translating channel having an output circuit and an amplification-control circuit, supplied with said corresponding pulses from said intercepting means and subject to random noise signals, an alarm circuit coupled to said output circuit of said channel and adjusted to be energized by a translated pulse having an amplitude slightly greater than said random noise signals, a noise detector coupled to said output circuit of said channel and including means for deriving a control potential in response to applied noise signals, a gating-signal generator synchronized with said transmitting means and coupled to said noise detector for producing a gating pulse in each repetition period of said pulse-type wave having a duration corresponding substantially to said duration of said operating intervals to disable said detector during said operating intervals, and means for coupling said potential-deriving means of said noise detector to said amplification-control circuit of said signal translating channel to apply said control potential thereto for adjusting the amplification of said channel inversely with the amplitude of noise signals applied to said detector thereby maintaining the amplitude of said random noise signals at a substantially constant level as applied to said alarm circuit.

5. In pulse echo apparatus including means for transmitting wave pulses having a given repetition period and means for intercepting corresponding pulses from remote objects occurring within operating intervals following transmitted pulses and having a duration equal to a fraction of said period, a receiving system comprising a signal translating channel having an output circuit and an amplification-control circuit, supplied with said corresponding pulses from said intercepting means and subject to random noise signals, an alarm circuit coupled to said output circuit of said channel and adjusted to be energized by a translated pulse having an amplitude slightly greater than said random noise signals, a noise detector coupled to said output circuit of said channel and including means for deriving a first control potential in response to applied noise signals, a gating-signal generator synchronized with said transmitting means and coupled to said noise detector for producing a gating pulse in each repetition period of said pulse-type wave having a duration corresponding substantially to said duration during said operating intervals to disable said detector during said operating intervals, additional potential-deriving means coupled to said output circuit of said channel and operative substantially only during the repetition of said corresponding pulses for deriving a second control potential having a magnitude dependent upon the amplitude of said corresponding pulses, means for coupling said potential-deriving means of said noise detector to said amplification-control circuit of said channel for applying said first control potential thereto for adjusting the amplification of said channel inversely with the amplitude of said noise signals, and means coupling said additional potential-deriving means to said amplification-control circuit of said channel and operated by said alarm circuit for applying said second control potential thereto only in the presence of received ones of said corresponding pulses to control the amplification of said channel.

6. In pulse echo apparatus including means for transmitting wave pulses having a given repetition period and means for intercepting corresponding pulses from remote objects within time intervals following the transmitted pulses and having a duration equal to a fraction of said period, a receiving system comprising a signal translating channel having an output circuit and an amplification control circuit, said channel being supplied with said corresponding pulses from said intercepting means and subject to random noise signals, means for sampling the output of said channel only during predetermined time intervals occurring outside of the time intervals when said corresponding pulses are intercepted for deriving a control potential in response to random noise signals, means for detecting said sampled output to provide a direct-current component thereof, means for integrating said direct-current component to provide an automatic gain control voltage, and means for applying said integrated voltage to said amplification control circuit for automatically varying the gain of said channel inversely as a function of said integrated voltage.

7. In pulse echo apparatus including means for transmitting wave pulses timed with respect to the occurrence of predetermined synchronization signals having a given repetition period and means for intercepting corresponding pulses from remote objects within time intervals following the transmitted pulses and having a duration equal to a fraction of said period, a receiving system comprising a signal translating channel having an output circuit and an amplification control circuit, said channel being supplied with said corresponding pulses from said intercepting means and subject to random noise signals, means timed with respect to said synchronization signals for sampling the output of said channel only during predetermined time intervals occurring outside of the time intervals when said corresponding pulses are intercepted for deriving a control potential in response to random noise signals, means for detecting said sampled output to provide a direct-current component thereof, means for integrating said direct-current component to provide an automatic gain control voltage, and means for applying said integrated voltage to said amplification control circuit for automatically varying the gain of said channel inversely as a function of said integrated voltage.

References Cited in the file of this patent

UNITED STATES PATENTS

| | | |
|---|---|---|
| 2,300,082 | Wilson | Oct. 27, 1942 |
| 2,402,445 | Poch | June 18, 1946 |
| 2,421,136 | Wheeler | May 27, 1947 |
| 2,429,513 | Hansen et al. | Oct. 21, 1947 |
| 2,446,244 | Richmond | Aug. 3, 1948 |
| 2,454,415 | Tourshou | Nov. 23, 1948 |
| 2,460,202 | Tyson | Jan. 25, 1949 |
| 2,466,959 | Moore | Apr. 12, 1949 |
| 2,521,016 | Miller | Sept. 5, 1950 |
| 2,538,028 | Mozley | Jan. 16, 1951 |